United States Patent
Aggarwal et al.

(10) Patent No.: US 10,263,893 B2
(45) Date of Patent: Apr. 16, 2019

(54) APPLICATION-LEVEL DYNAMIC SCHEDULING OF NETWORK COMMUNICATION FOR EFFICIENT RE-PARTITIONING OF SKEWED DATA

(71) Applicant: Oracle International Corporation, Redwood Shores, CA (US)

(72) Inventors: Vikas Aggarwal, Redwood City, CA (US); Ankur Arora, Vancouver (CA); Sam Idicula, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 170 days.

(21) Appl. No.: 15/372,224

(22) Filed: Dec. 7, 2016

(65) Prior Publication Data
US 2018/0159774 A1 Jun. 7, 2018

(51) Int. Cl.
*H04L 12/801* (2013.01)
*H04L 29/08* (2006.01)
*H04L 12/805* (2013.01)

(52) U.S. Cl.
CPC ............ *H04L 47/12* (2013.01); *H04L 47/365* (2013.01); *H04L 67/1095* (2013.01); *H04L 67/32* (2013.01)

(58) Field of Classification Search
CPC ..... H04L 47/12; H04L 67/1095; H04L 67/32; H04L 47/365
See application file for complete search history.

(56) References Cited

U.S. PATENT DOCUMENTS

| 2004/0215805 A1 | 10/2004 | Tan |
| 2009/0154481 A1 | 6/2009 | Han |
| 2016/0337442 A1 | 11/2016 | Idicula et al. |

FOREIGN PATENT DOCUMENTS

EP  1 130 872 A1  9/2001

OTHER PUBLICATIONS

Palur et al., "Understanding Torus Network Performance through Simulations", dated 2014, 2 pages.
Mohammad Al-Fares et al., "Hedera: Dynamic Flow Scheduling for Data Center Networks", In Proceedings of the 7th USENIX conference on Networked Systems Design and Implementation Apr. 2010, 15 pages.
Long et al., "Longest-queue-first scheduling under SINR interference model", ACM, dated Sep. 20, 2010, 10 pages.
(Continued)

*Primary Examiner* — Omer S Mian
(74) *Attorney, Agent, or Firm* — Hickman Palermo Becker Bingham LLP (57) ABSTRACT

Techniques are provided for using decentralized lock synchronization to increase network throughput. In an embodiment, a first computer sends, to a second computer comprising a lock, a request to acquire the lock. In response to receiving the lock acquisition request, the second computer detects whether the lock is available. If the lock is unavailable, then the second computer replies by sending a denial to the first computer. Otherwise, the second computer sends an exclusive grant of the lock to the first computer. While the first computer has acquired the lock, the first computer sends data to the second computer. Afterwards, the first computer sends a request to release the lock to the second computer. This completes one duty cycle of the lock, and the lock is again available for acquisition.

23 Claims, 8 Drawing Sheets

(56) References Cited

OTHER PUBLICATIONS

EG Gran, SA Reinemo. "InfinBand congestion control: modelling and validation", In Proceedings of the 4th International ICST Conference on Simulation Took and Techniques(ICST), 2011, 8 pages.

Anonymous:, "Time Division Multiple Access Wikipedia, the free encyclopedia", from the internet https://web.archive.org/web/20150509120053, dated Sep. 7, 2016, 4 pages.

Alan R Hevner et al., "Query Processing in Distributed Database System", dated May 1, 1979, from the internet, http://ieexplore,ieee.org.ielx5/32/35910/01702617, 12 pages.

Zahavi, Eitan, "Optimized InfiniBand Fat-Tree Routing for Shift All-to-All Communication Patterns", Concurrency Concurrency and Computation: Practice and Experience, dated 2009, 15 pages.

Zahavi, Eitan, "Fat-TreeRouting and Node Ordering Providing Contention Free Traffic for MPI Global Collectives", dated 2012, 10 pages.

Rodiger et al., "Locality-Sensitive Operators for Parallel Maon-Memory Database Clusters", Snowflake Computing, Inc, 12 pages.

Perry et al., "Fastpass: A Centralized Zero-Queue", Datacenter Network, SIGCOMM, dated Aug. 2014, 12 pages.

Novakovic et al., "Scale-Out Numa", In Proceedings of ASPLOS—XIX, dated Mar. 2014, 15 pages.

Idicula, U.S. Appl. No. 14/711,617, filed May 13, 2015, Notice of Allowance, dated Feb. 15, 2017.

APPLICATION-LEVEL DYNAMIC SCHEDULING OF NETWORK COMMUNICATION FOR EFFICIENT RE-PARTITIONING OF SKEWED DATA

FIELD OF THE DISCLOSURE

This disclosure relates to computer network congestion. Techniques are presented for distributed dynamic scheduling of communication to avoid contention at network elements.

BACKGROUND

A complex, high-performance processor may have a core and coprocessors. The core offloads tasks to its coprocessors, which perform specialized functions for which they are optimized. The type and number of coprocessors depends on system aspects such as performance, the mix of tasks that need to be offloaded from the core, and power and size limits.

A challenge in developing scalable, distributed applications is efficient data exchange between participating computers of a distributed system. In large-scale systems, network performance and scalability are as critical as the performance of the computers. Some communication patterns such as all-to-all exchange are common within various application domains including high performance computing (HPC) and data analytics. However, these applications are traditionally difficult to optimize for network performance.

In the context of distributed query processing, some operations such as joins, aggregations, and sorts often need to repartition or otherwise redistribute the data across various computers in a system which may involve an all-to-all communication. The cost of data redistribution over a network may substantially increase query execution latency. As a result, efficient data redistribution is crucial for achieving high performance and scalability for distributed query processing. System throughput is further challenged by data skew, when computers have different amounts of data to send to each other during redistribution. Traditional techniques might work well for uniform data distribution, such as with shift-pattern communication, but perform poorly with data skew.

Some systems have non-blocking, high-bandwidth networks such as InfiniBand for reducing data communication time for an application. However, when the nodes perform all-to-all communication without any scheduling/ordering over an InfiniBand network, the bandwidth of the interconnect network is inefficiently utilized. As the number of communicating nodes in the system increase, the achievable network bandwidth may fall significantly below its peak.

The degradation in performance can be largely attributed to two reasons: 1) contention/congestion at a receiving endpoint, and 2) contention for a common inter-switch link in switches composed of a two-level fat tree. Contention at a receiving computer occurs when multiple senders simultaneously attempt to send data to a common receiver. As a result, all computers that attempt to send data to this common receiver may experience backpressure and degraded bandwidth.

Contention or oversubscription on inter-switch links occurs when communication between two or more independent pairs of computers makes use of the same inter-switch links which are used to connect the leaf and spine switches in a two-level fat-tree. Because each inter-switch link can only support the peak data rate between a single pair of computers, sharing of this link by more than a single pair leads to proportional reduction of bandwidth for each of the independent traffic flows that share a common link.

Furthermore, the above observations may be more or less applicable to bulk synchronous parallel (BSP) systems such as the shuffle phase of MapReduce. During a shuffle, each reducer pulls data from every mapper. Shuffle is another example of all-to-all data redistribution and may saturate switches. Data skew occurs when one reducer receives more data from mappers than another reducer receives during a same shuffle.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example System
2.1 Network Contention
2.2 Mutex Lock
2.3 Transmitted Interactions
2.4 Acquisition Denial
2.5 Acquisition Granted
2.6 Remote Lock
2.7 Lock Release
2.8 Starvation and Disassembly
3.0 Cross Talk
4.0 Network Bridge
4.1 Trunk Saturation
4.2 Trunk Lock
4.3 Network Topologies
5.0 Fat Tree
6.0 Composable Locks
6.1 Graph Rebalancing 6.2 Deadlock Prone
6.3 Deadlock Avoidance
6.4 Prioritization By Receiver
6.5 Back Off
7.0 Encapsulated Concerns
8.0 Prioritization By Sender
9.0 Pipelining
10.0 Hardware Overview

1.0 General Overview

Techniques are provided for using decentralized lock synchronization to increase network throughput. In an embodiment, a first computer sends, to a second computer comprising a lock, a request to acquire the lock. In response to receiving the lock acquisition request, the second computer detects whether the lock is available. If the lock is unavailable, then the second computer replies by sending a denial to the first computer. Otherwise, the second computer sends an exclusive grant of the lock to the first computer. While the first computer has acquired the lock, the first computer sends data to the second computer. Afterwards, the first computer sends a request to release the lock to the second computer. This completes one duty cycle of the lock, and the lock is again available for acquisition.

In an embodiment with multiple switches interconnected by communication links, each inter-switch link is associated with its own lock, which may be hosted on any computer.

In an embodiment, denial of an acquisition request may bear information to assist a computer with deciding how to react to denial.

In an embodiment, an atomic network operation implements a remote lock. In an embodiment, additional behavior for acquiring multiple locks prevents deadlock.

2.0 Example System

Figure 1:
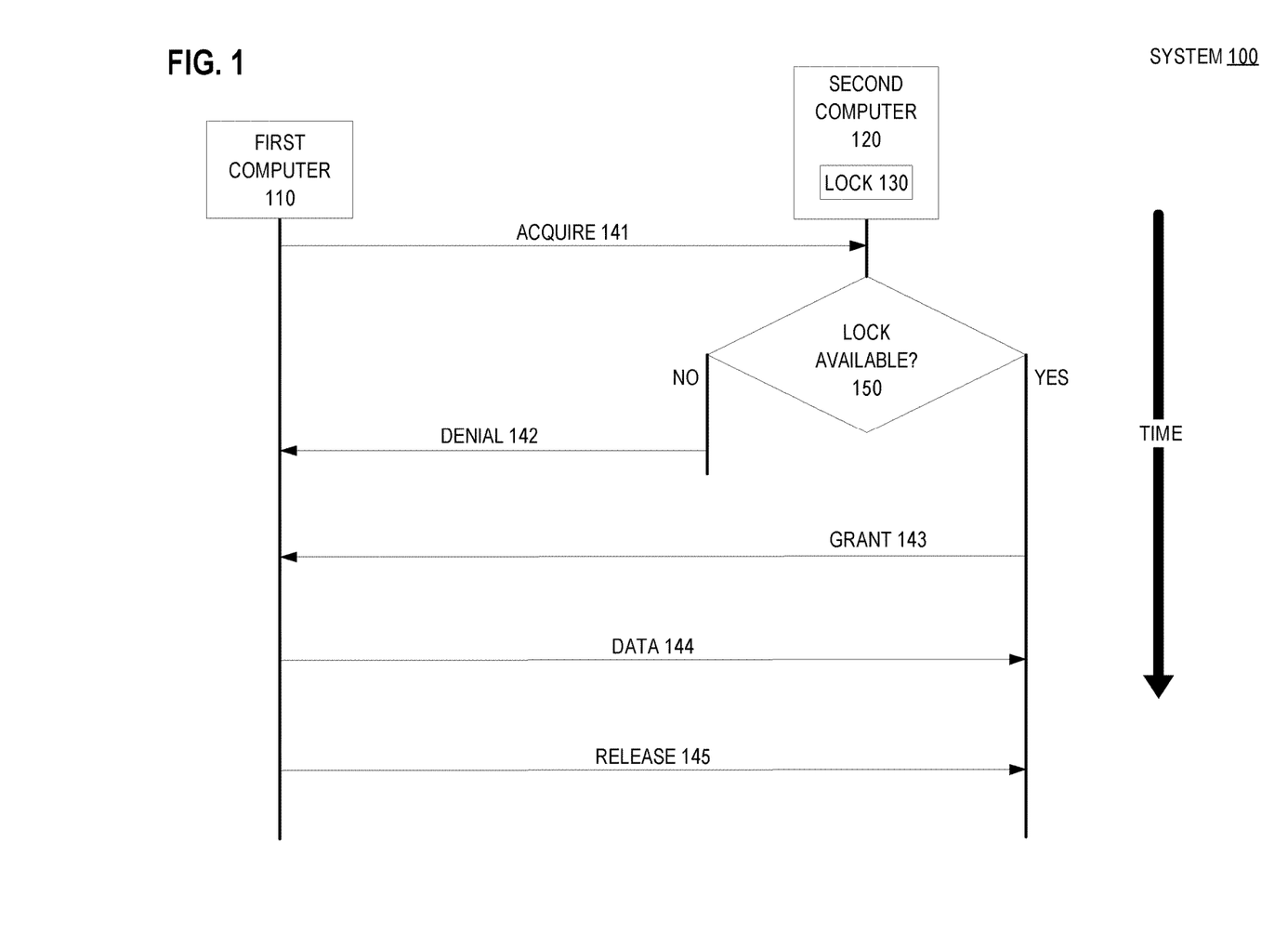
FIG. 1 is a scenario diagram that depicts lock synchronization interactions within an example system of computers to increase network throughput, in an embodiment.

FIG. 1 is a scenario diagram that depicts interactions within an example system 100, in an embodiment. Example system 100 uses lock synchronization to increase network throughput.

System 100 contains computers 110, 120, and (although not shown) at least one other computer. Each of these computers may be a rack server such as a blade, a personal computer, a mainframe, a smartphone, a networked appliance, or other networked computing device. Computers 110 and 120 communicate with each other over a computer network, such as a local area network (LAN) or internetwork of networks.

First computer 110 may have data to send to second computer 120. However, a third computer may also have data to send to second computer 120.

2.1 Network Contention

If the first and third computers were to send data to second computer 120 at the same time, their traffic would collide. For example, the network interface card (NIC) of second computer 120 may become saturated.

Alternatively, a shared communication resource such as a network element that is common to both transmissions could suffer contention. In either case, packet loss and retransmission may occur.

When two transmissions collide, one or both of them must be retransmitted, thereby reducing network throughput. System 100 uses lock synchronization to reduce collisions.

To reduce contention, the computers of system 100 serialize their data transmissions that are destined for a same recipient, such as second computer 120. The computers of system 100 coordinate at traffic control to treat second computer 120 as an endpoint that can receive only one transmission at a time.

2.2 Mutex Lock

To achieve this coordination, second computer 120 contains lock 130. Lock 130 may be used to manage mutually exclusive access to second computer 120.

Lock 130 may be a hardware lock or a software lock. Lock 130 is mutually exclusive and may be a mutex.

However, lock 130 typically is not blocking. If lock 130 is unavailable (acquired by another computer), then a request to acquire lock 130 fails without waiting for lock 130 to become available.

Although not shown, first computer 110 may have its own lock to mediate inbound transmissions. For example, computers 110 and 120 may be peers in a distributed application, such as graph analysis, that is hosted on a Beowulf cluster.

As such, each computer of system 100 may have its own receiver lock, such as 130. In an embodiment, the hosting of lock 130 is decoupled from the computer, such as 120, for which lock 130 mediates access.

For example, lock 130 may be hosted on second computer 120 as shown, and yet be used by the computers of system 100 to mediate access to a different computer as a receiver, such as first computer 110. This cross-hosting of locks may more evenly distribute network traffic by sending data to one computer and the data's lock control traffic to another computer.

2.3 Transmitted Interactions

In operation, first computer 110 may have application data to send to second computer 120. A sequence of interactions occurs within system 100 to accomplish sending the data.

Interactions between computers 110 and 120 are shown as horizontal arrows, such as acquire 141. As shown, the passage of time progresses downward. For example, interaction 141 occurs before 142.

Having data to send to second computer 120, first computer 110 attempts to acquire lock 130 by sending acquire 141. Shown interactions, such as 141, are communications such as a message or an invocation.

For example, a communication may be a hypertext transfer protocol (HTTP) request, a remote procedure call, an asynchronous message, a command such as an atomic hardware operation, or a network packet such as a datagram. Raw transport for a communication may be connectionless, such as user datagram protocol (UDP), or connection oriented such as transmission control protocol (TCP).

2.4 Acquisition Denial

Second computer 120 receives acquire 141 and detects whether lock 130 is available or granted to another computer. This detection is shown as "lock available?" 150.

If lock 130 is unavailable, second computer 120 responds by sending denial 142 to first computer 110.

With the exception of lock-control signaling, the computers of system 100 are configured not to transmit application data to second computer 120 without first acquiring lock 130. If first computer 110 receives denial 142, then first computer 110 must refrain from sending data to second computer 120.

However, receipt of denial 142 does not mean that first computer 110 must block or sleep. Instead, first computer 110 may reattempt to acquire lock 130 by sending another acquisition request to second computer 120.

If first computer 110 also has data to send to a third computer and receives denial 142, then first computer 110 may attempt to acquire the lock of the third computer. If first computer 110 has already acquired that lock, then first computer 110 may send data to the third computer.

2.5 Acquisition Granted

If lock 130 is available, then second computer 120 sends grant 143 to first computer 110. Upon receiving grant 143, first computer 110 may send data 144 to second computer 120.

Data 144 may be any bounded content stream, such as the contents of a file or buffer. By a convention such as an honor system or by actual enforcement, first computer 110 should refrain from holding lock 130 indefinitely.

2.6 Remote Lock

Each computer may host any number of locks, which are effectively remotely-accessible objects, whether inherently or by a container or other software wrapper. Hosting a lock by a computer includes the computer having ownership of data structures that are internal and/or private to the lock.

Lock hosting also includes exclusive responsibility for answering acquisition and release requests. Lock hosting further includes providing a remote interface to the lock to which other computers may send lock requests.

The remote interface may use various mechanisms to expose a lock. For example, a remote interface may accept data packets or network hardware operations. These implementation choices may determine, at a low level, what precise content is transmitted for the shown interactions.

In an embodiment, acquire 141 is transmitted as a single physical packet, such as an InfiniBand packet, an Ethernet packet, or a Fibre Channel frame. In an embodiment, grant 143 is transmitted as a single physical packet.

In an embodiment, acquire 141 may bear an atomic hardware operation that second computer 120 may process with little or no software execution. For example, the atomic operation may be a compare-and-swap (CAS), test-and-set (TAS), or fetch-and-add (FAA) such as provided by InfiniBand.

Lock implementation may be delegated to some objects or operations of an operating system that have suitable semantics. For example, a lock operation should not be idempotent.

In an embodiment, binding to a socket is not idempotent and constitutes granting a lock. In an embodiment, renaming a file is not idempotent and constitutes granting a lock.

2.7 Lock Release

For example, lock 130 may be leased to first computer 110 for a fixed duration or transmission of a fixed amount of data. In embodiments, the fixed amount of time or data is statically configurable or dynamically tunable.

In an embodiment, first computer 110 releases lock 130 immediately after data 144 is sent, even if the fixed duration has not elapsed, such as when a lease is still unexpired. In an embodiment, second computer 120 sends denials to other computers that request lock 130 while first computer 110 holds lock 130.

First computer 110 releases lock 130 by sending release 145 to second computer 120. Upon receipt of release 145, second computer 120 may grant the next acquisition request that second computer 120 receives.

2.8 Starvation and Disassembly

First computer 110 may have more data to send to second computer 120 than can be sent during one lease (lock acquisition). For example, first computer 110 may need to send two megabytes, but a lock lease authorizes sending only one megabyte. Likewise, a lease may last one second, but sending two megabytes may take two seconds.

In these cases, first computer 110 may use a size threshold to disassemble a large data to be sent in chunks to second computer 120. First computer 110 should reacquire and then release lock 130 for each transmission of a chunk.

This may help prevent starvation of other senders that need to send data to second computer 120. Likewise, it may help prevent starvation of other receivers (besides second computer 120) that first computer 110 has data ready for sending to.

3.0 Cross Talk

Figure 2:
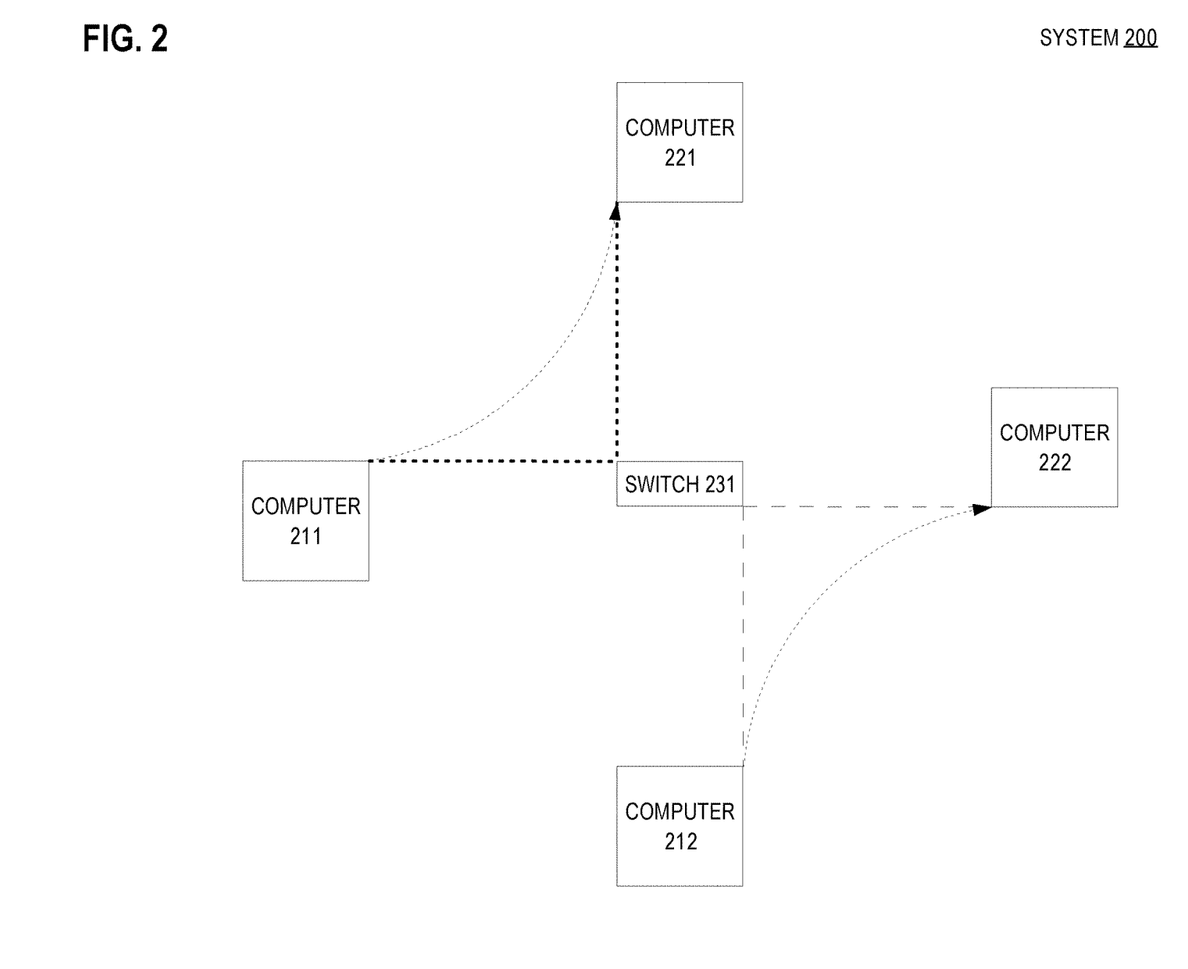
FIG. 2 is a block diagram that depicts simultaneous data transmissions through a shared switch, in an embodiment.

FIG. 2 is a block diagram that depicts simultaneous data transmissions through a shared switch in example system 200, in an embodiment. System 200 may be an embodiment of system 100.

System 200 contains switch 231 that is connected by network communication links to computers 211-212 and 221-222. Switch 231 may be a crossbar switch, a router, or other network element that can simultaneously relay different data streams to different recipients. However, switch 231 should not be a hub, because a hub does not simultaneously conduct multiple streams.

As shown and through switch 231, computer 211 may send data to computer 221 at the same time that computer 212 sends data to computer 222. For example, switch 231 may have multiple ports to enable concurrent transmissions.

However, concurrent transmissions require that no computer be a common endpoint for both transmissions. For example, contention occurs when both of computers 211-212 attempt simultaneous transmissions to computer 221.

As such, a saturated endpoint (e.g. computer 221) can cause contention. The locking techniques described above may reduce that contention.

4.0 Network Bridge

Figure 3:
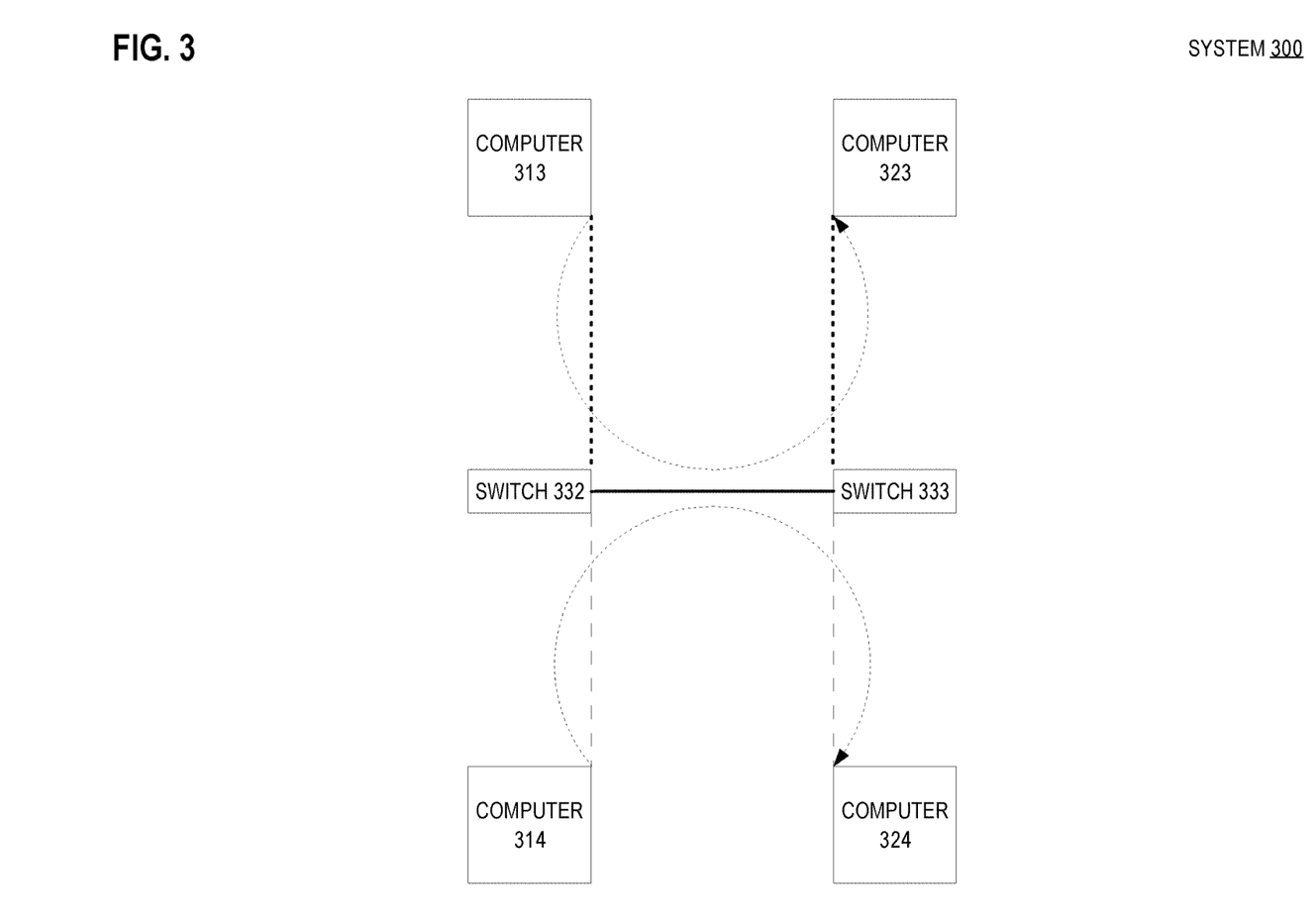
FIG. 3 is a block diagram that depicts a saturated trunk that causes contention, in an embodiment.

However, a saturated endpoint is not the only possible cause of contention. FIG. 3 is a block diagram that depicts a saturated trunk that causes contention in example system 300, in an embodiment. System 300 may be an embodiment of system 100.

System 300 contains switches 332-333 and computers 313-313 and 323-324. Switches 332-333 are connected to each other by a network trunk communication link.

For example, the trunk link may bridge separate LANs. For example, switch 332 and computers 313-314 may be components that occupy one LAN, while switch 333 and computers 323-324 may be components that occupy another LAN.

In an embodiment, each LAN and its components occupy a separate computer card, chip package, or system on a chip (SoC). In an embodiment, both LANs are virtual LANs (VLANs) that are backed by a same or different physical LANs.

4.1 Trunk Saturation

Computer 313 may attempt to send data to computer 323 at the same time as computer 314 attempts to send data to computer 324. As shown, both of these data transmissions pass through the network trunk.

Simultaneous attempts at transmission over the trunk may collide. If the trunk link is half duplex, such as a single wire, then a collision may occur regardless of whether both transmissions attempt to traverse the trunk in the same direction as shown or in opposite directions.

4.2 Trunk Lock

Unfortunately, the techniques described above for associating a transmission lock with each endpoint computer will not avoid the trunk contention shown. However, associating an additional lock with the trunk link itself can solve the trunk contention.

Ideally, any of computers 313-314 and 323-324 may host (contain) the trunk lock and mediate acquisition of the trunk lock by the computers. In an embodiment, either of switch 332-333 hosts the trunk lock. However, this is suboptimal because switches may be too busy to manage a lock.

The trunk lock should be acquired in conjunction with acquiring an endpoint lock. For example, computer 313 should acquire both of the trunk lock and the lock of computer 323 before sending data to computer 323.

4.3 Network Topologies

A network route between a sender and a receiver may traverse an arbitrary amount of switches and a corresponding amount of links that join pairs of those switches. Each involved link that joins two switches may have its own associated link lock.

For example, switches may be arranged together as an interconnection tree (hierarchical lattice), such that leaf switches (near the bottom of the tree) connect to many computers but few other switches, perhaps including only a single switch that is higher within the tree. Whereas other switches, such as root switches (near the top of the tree) connect mostly or solely to other switches.

A consequence of multi-lock transmissions is that each sender must know some or all of the network topology of the system in order to know which link locks to acquire. Indeed even in system 302 as shown, computer 313 should know that reaching computer 323 involves the trunk, whereas reaching computer 314 does not.

5.0 Fat Tree

Figure 4:
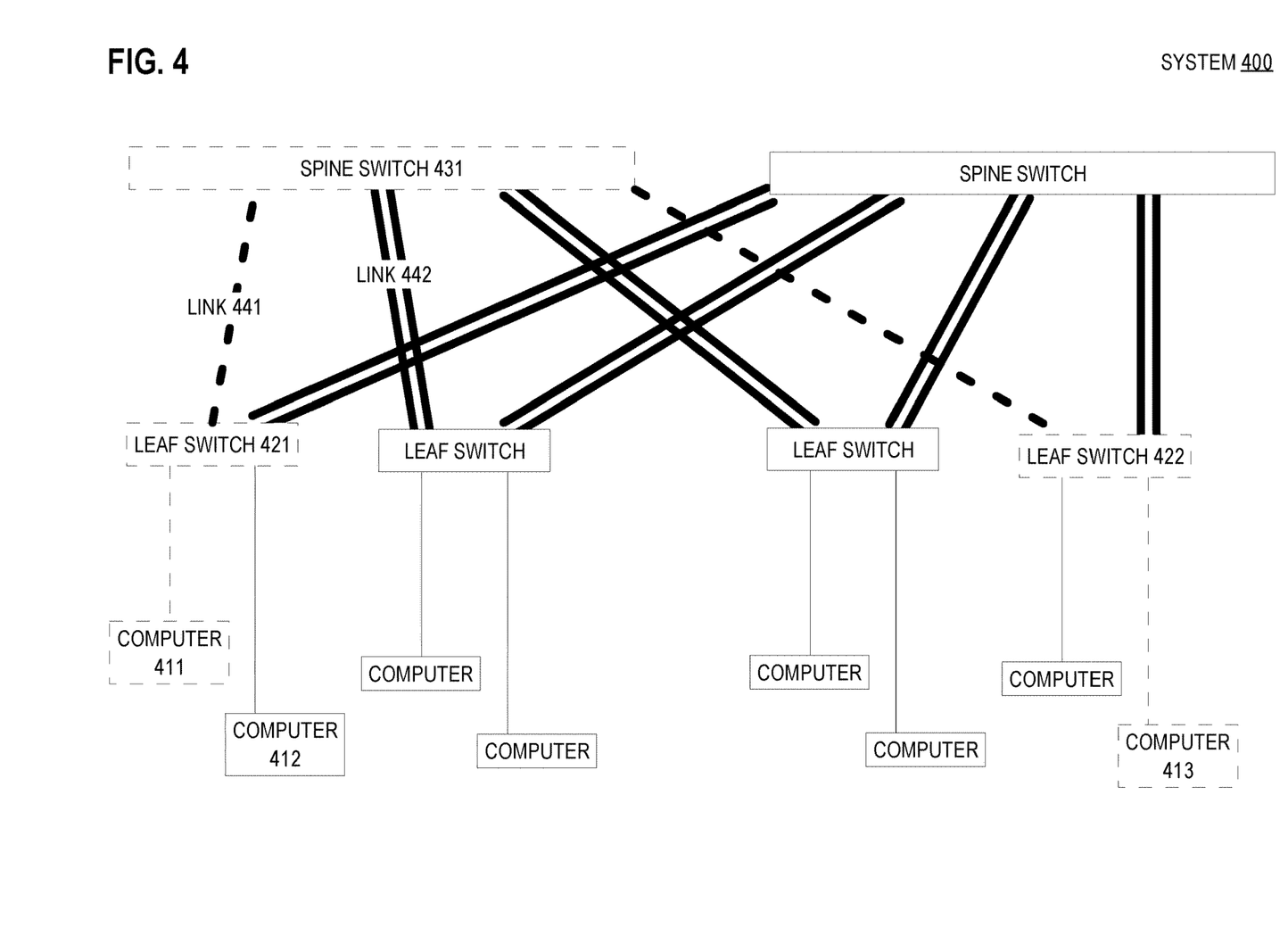
FIG. 4 is a block diagram that depicts a fat-tree InfiniBand network, in an embodiment.

FIG. 4 is a block diagram that depicts example fat-tree system 400, in an embodiment. System 400 may be an embodiment of system 100.

System 400 switches, such as 421-422 and 431, and computers such as 411-413. The switches of system 400 are arranged in two layers (leaves and spines) as a fat tree. Each leaf switch, such as 421, is connected to its computers, such as 411-412, and some or all spine switches, such as 431.

Each spine switch is connected to some or all leaf switches. For example, spine switch 431 is connected to multiple leaf switches, including 421-422. Leaf switches need not be connected to each other.

Spine switches need not be connected to each other. An inter-switch link connects a leaf switch to a spine switch.

The tree is fat because inter-switch links are wider (higher bandwidth) than links between leaf switches and computers. For example, link 441 has more bandwidth than the link between leaf switch 421 and computer 411.

The fat tree may be implemented as an InfiniBand topology. An InfiniBand network may employ a fat-tree routing algorithm.

Computer 411 may stream data to computer 413 over network links and through switches 421-422 and 431. This route is shown with dashed lines.

Computers 411-412 may simultaneously try to stream data over link 440, which is contentious. Contention between these two traffic streams is avoided by associating an additional lock with each fat (inter-switch) link.

For example, a lock may be associated with link 440. The computers of system 400 should acquire the lock before sending data over link 440.

To keep the overhead of managing the locks for the inter-switch links low, computers of the network host the inter-switch locks. When the number of inter-switch links is the same as the number of computers in a system, each computer hosts only one additional lock for an inter-switch link.

In an embodiment, an inter-switch link is wide because it is full duplex. For example, link 442 may actually be a pair of half-duplex links aligned in opposite directions.

Access to each half-duplex link may be mediated by a separate lock. For example, link 442 may actually have two locks.

In an optimistic embodiment, a sender need not acquire the lock of a downlink from a spine switch. For example, computer 411 may stream data up link 441, through spine switch 431, and down link 442.

For that route, computer 411 should lock (acquire) link 441 but not 442. As such, each sender should acquire only one inter-switch lock and one receiver lock to optimistically presume contention-free communication with another computer.

6.0 Composable Locks

Figure 5:
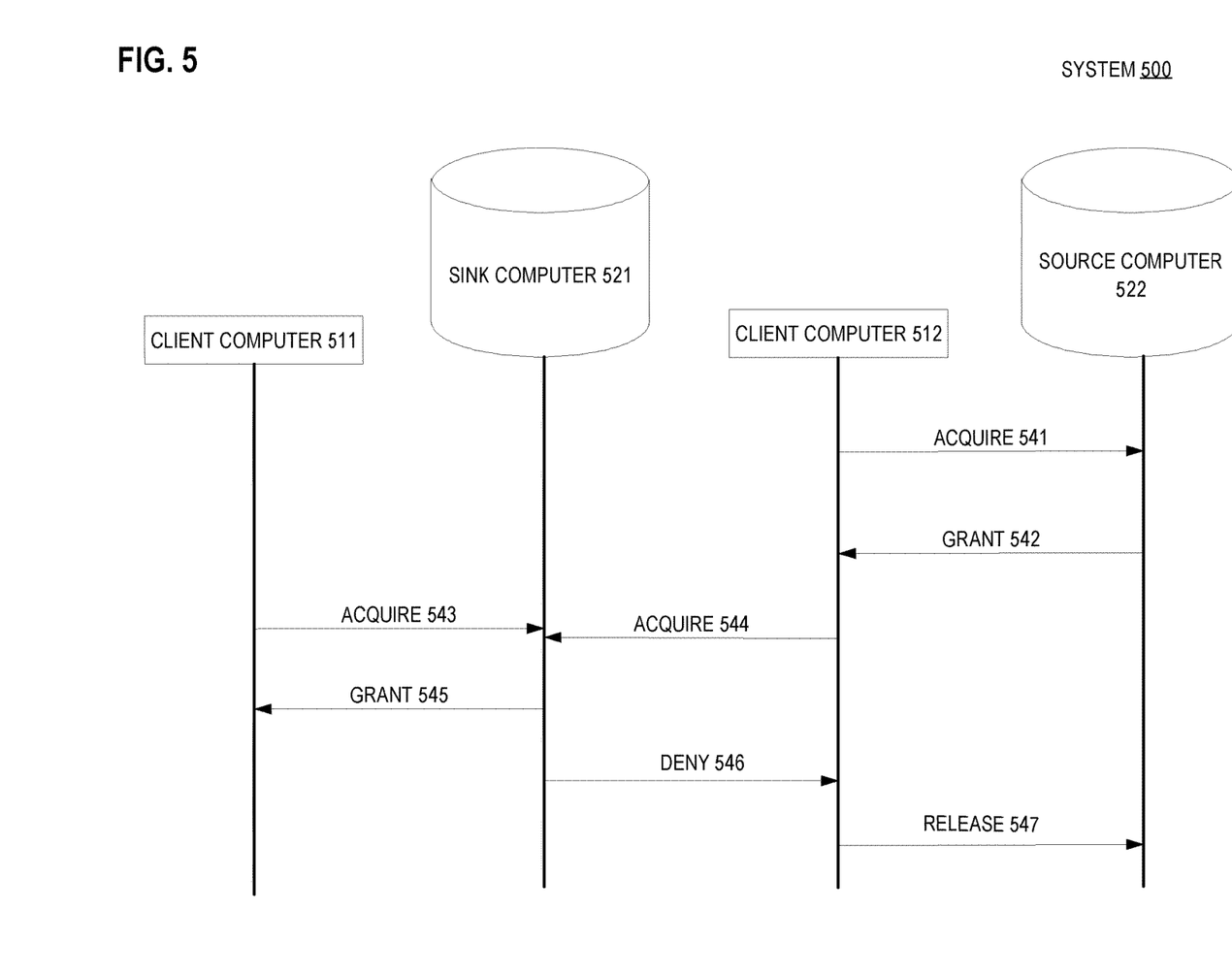
FIG. 5 is a scenario diagram that depicts interactions between computers within an example system to acquire multiple locks, in an embodiment.

FIG. 5 is a scenario diagram that depicts example interactions between computers within an example system 500 to acquire multiple locks, in an embodiment. System 500 may be an embodiment of system 100.

System 500 contains computers 511-512 and 521-522. Although not shown, computers 521-522 contain mutex locks for senders to acquire as a prerequisite of data transmission.

6.1 Graph Rebalancing

In this example, each of the computers of system 500 contains a portion of a distributed graph. At the beginning of a long-running analysis, each computer may start with an equal share of the graph.

However, accumulated graph mutations may eventually cause the allocation of graph data to become imbalanced (uneven). This may cause an overloaded computer to become a computational or communicative bottleneck that impacts the analysis throughput of system 500.

Computer 512 may attempt to rebalance system 500 by redistributing (moving) some graph data from one computer to another. However, congestion is not the only problem that rebalancing may experience.

6.2 Deadlock Prone

Coordination is further complicated by concurrent unrelated transactions. For example, client computer 511 may be simultaneously attempting to transfer graph data from sink computer 521 to source computer 522, which is in the opposite direction of the graph data transfer by client computer 512. For example, after grant 545, possession of the locks of computers 521-522 is split between client computers 511-512.

Client computer 511 holds the lock of sink computer 521, while client computer 512 holds the lock of source computer 522. However, both of client computers 511-512 still need to acquire another lock. For example, client computer 512 still needs to acquire the lock of sink computer 521.

Each of client computers 511-512 holds one lock, still needs another lock, and neither computer can proceed. As such, system 500 is deadlocked.

6.3 Deadlock Avoidance

However, such deadlock is avoidable by imposing heuristics for acquiring multiple locks. Each of client computers 511-512 should acquire all locks needed for a transaction before performing the transaction.

For example, client computer 512 should send both of acquires 541 and 544 and receive corresponding grants before transferring graph data between computers. Furthermore, all client computers should acquire locks in the same relative order.

For example, both of client computers 511-512 attempt graph data transfers that involve computers 521-522. As such, client computers 511-512 should acquire the locks of computers 521-522 in the same order, regardless of which direction graph data is being moved.

For example, both of client computers 511-512 should acquire the lock of source computer 522 before acquiring the lock of sink computer 521, even though client computers 511-512 are moving graph data in opposite directions.

When a sender holds one of two needed locks, the sender should release the held lock if the other lock is denied. For example, when client computer 512 receives deny 546 from sink computer 521, client computer 512 should send release 547 to source computer 522. Afterwards, client computer 512 may try again to acquire both locks in the same order.

6.4 Prioritization by Receiver

Rival acquires 543-544 may be contentious by more or less simultaneously arriving at sink computer 521. Depending on the implementation, sink computer 521 may have discretion as to which of acquire 543-544 wins the requested lock.

For example, sink computer 521 may receive acquires 543-544 at different times, buffer both of them for a while, and then have to decide which of acquires 543-544 should get priority. As such, sink computer 521 may send a grant to one client and a deny to the other client.

In an embodiment, sink computer 521 generates a random number to decide which client gets the lock. In an embodiment, sink computer 521 grants its lock based on which of acquires 543-544 was first received.

In an embodiment, sink computer 521 grants its lock to whichever client has more data to send to sink computer 521. For example, each of acquires 543-544 may indicate how much data does a client have to send to sink computer 521.

In an embodiment, sink computer 521 grants its lock to whichever client has more data to send to all other computers combined. For example, each of acquires 543-544 may indicate how much data does a client have to send to all other computers combined.

6.5 Back Off

Within deny 546, sink computer 521 may provide, and client computer 512 may consider, conditions that surround the denial. These conditions may indicate how much contention is the lock of sink computer 521 withstanding. Client computer 512 may analyze the conditions indicated by deny 546 to decide whether to immediately continue trying to acquire the lock or whether to defer a retry and perhaps negotiate data transmissions to another computer instead.

In an embodiment, deny 546 bears a count of denials sent by sink computer 521 since sink computer 521 last granted its lock. In an embodiment, deny 546 bears the sum of sizes of data transmissions denied by sink computer 521 since sink computer 521 last granted its lock.

7.0 Encapsulated Concerns

Topological knowledge, route identification, lock acquisition, deadlock avoidance, and back-off may be concerns that are orthogonal to and apart from analysis application semantics. In an embodiment, some or all of these concerns are encapsulated into a software module or layer that is shared by, and more or less opaque to, applications.

In an embodiment, a distributed graph analysis framework encapsulates route and lock concerns. As such, the logic of a custom graph algorithm may ignore these concerns and yet benefit from them more or less effortlessly.

In an embodiment, route and lock concerns are encapsulated in a network driver. This is a generally applicable approach to support an ecosystem of unrelated applications.

An advantage of an encapsulation that is simultaneously shared by multiple applications is that contention can be reduced across a whole ecosystem of applications, instead of merely benefiting an isolated application that happens to embed the encapsulation. For example, this may achieve traffic control of multiple applications in a non-intrusive way.

8.0 Prioritization by Sender

Figure 6:
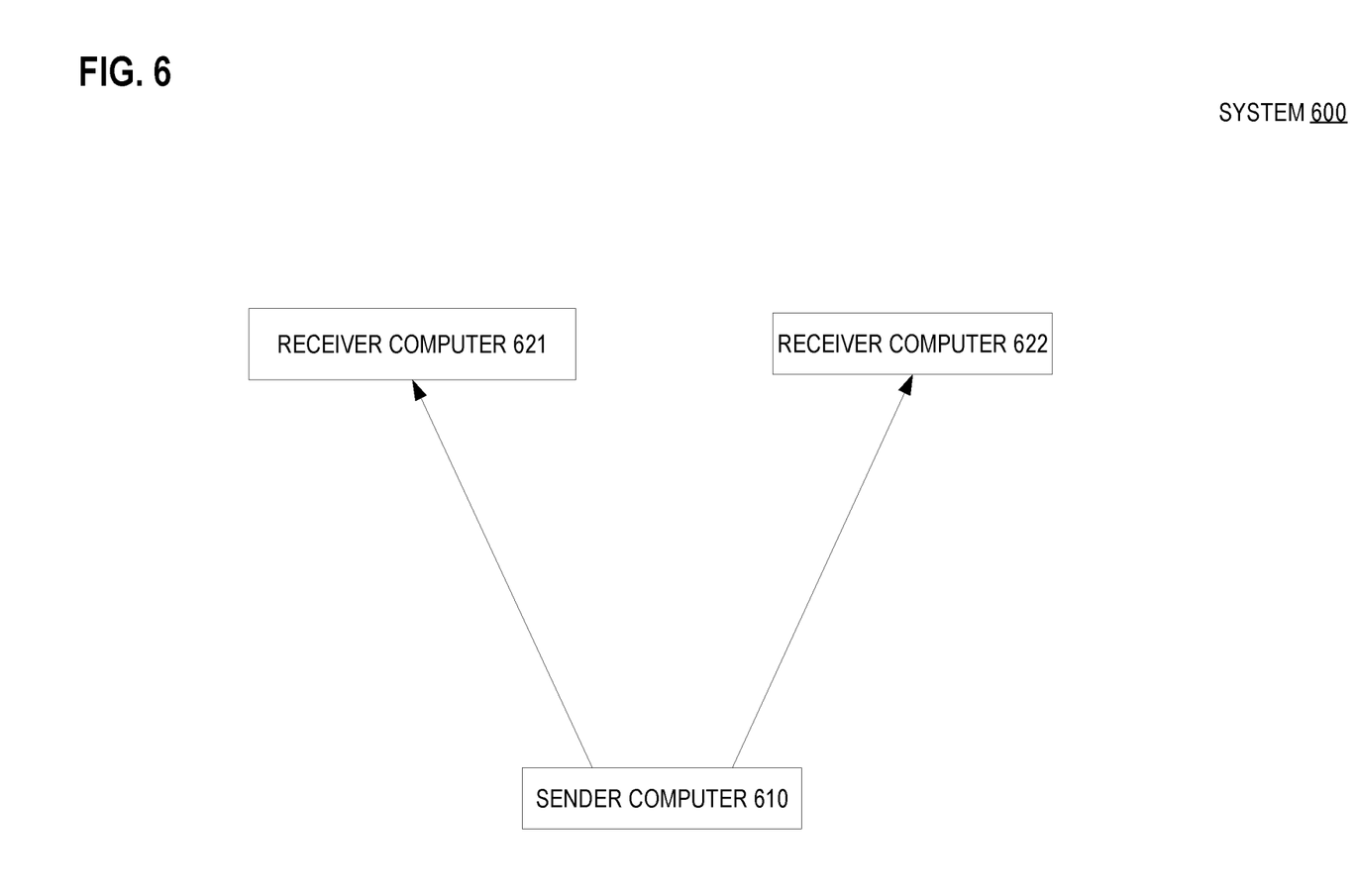
FIG. 6 is a block diagram that depicts an example system that sends data from one computer to multiple computers, in an embodiment.

FIG. 6 is a block diagram that depicts an example system 600 that sends data from one computer to multiple computers, in an embodiment. System 600 may be an embodiment of system 100.

System 600 contains at least computers 610 and 621-622. Sender computer 610 has data that is ready to send to each of receiver computers 621-622.

Receiver computers 621-622 may both receive data at the same time. However, sender computer 610 may send data to only one recipient at a time, such as when sender computer 610 has only one network interface card (NIC).

To avoid contention, sender computer 610 should serialize its transmissions to receiver computers 621-622. For example, sender computer 610 may decide to send data to receiver computer 621 before sending data to receiver computer 622.

In an embodiment, sender computer 610 generates a random number to select which of receiver computers 621-622 to send data to first. In an embodiment, sender computer 610 sends data to receiver computers in the same order that the data became ready to send, such as when sender computer 610 contains a queue of outbound data.

Sender computer 610 may have more data to send to receiver computer 621 than to receiver computer 622. In an embodiment, sender computer 610 detects this imbalance and sends data to receiver computer 621 first.

9.0 Pipelining

Figure 7:
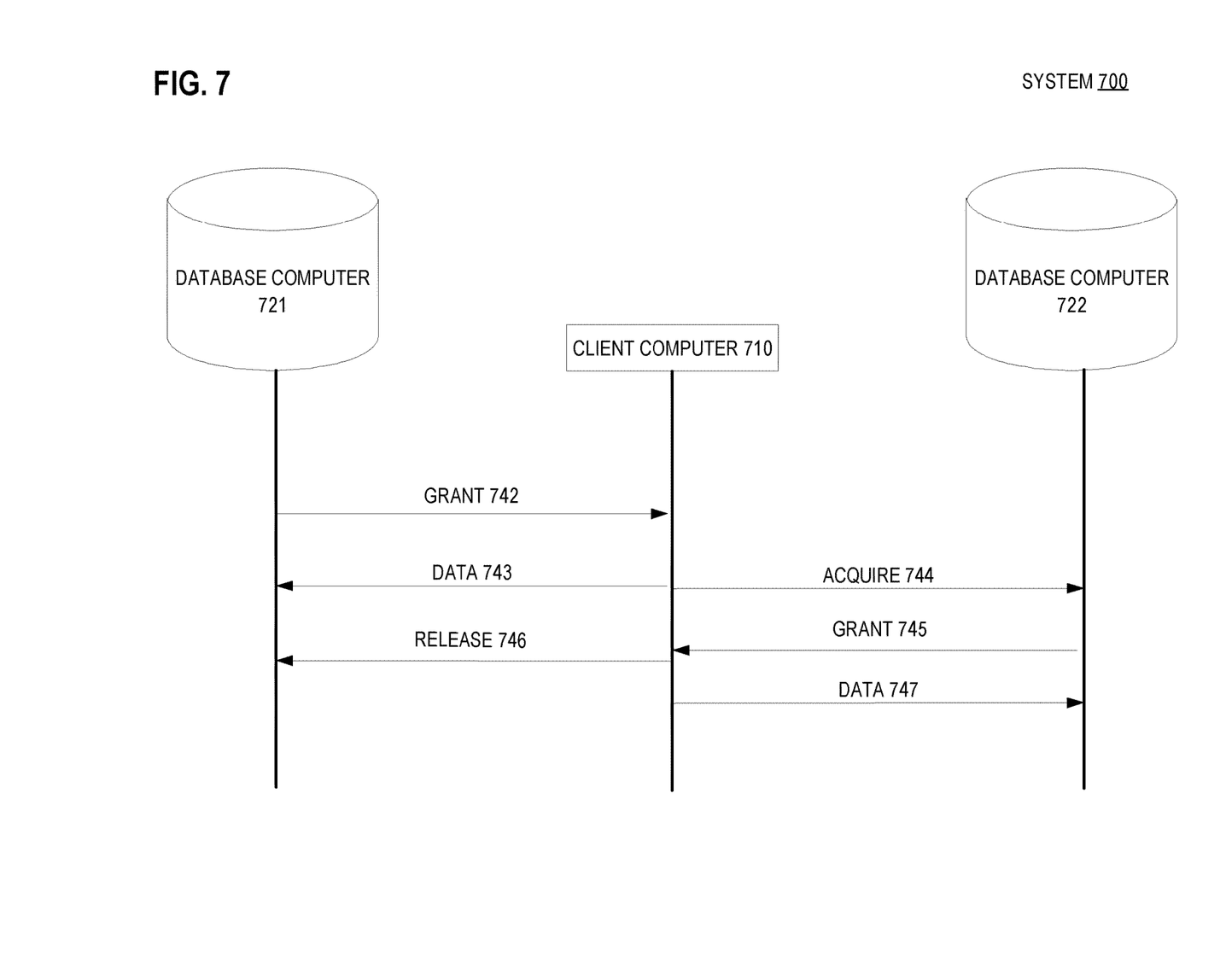
FIG. 7 is a scenario diagram that depicts interactions between computers within an example system to achieve pipelining, in an embodiment.

FIG. 7 is a scenario diagram that depicts example interactions between computers within an example system 700 to achieve pipelining, in an embodiment. System 700 may be an embodiment of system 100.

System 700 contains computers 710 and 721-722. Although not shown, system 700 may contain a distributed database.

For example, each of database computers 721-722 may store a partition of a database table. Although not shown, each of database computers 721-722 contains a mutex lock that a sender must acquire before sending.

In this example, client computer 710 has data to send to each of database computers 721-722. For example, client computer 710 may access the table partition on each of database computers 721-722. For example, client computer 710 may send a query to each of database computers 721-722 for processing against their partitions.

Client computer 710 may acquire the lock of database computer 721, send data, and then release the lock. Afterward, client computer 710 may repeat this with database computer 722.

However, system 700 need not fully serialize the data transmission transactions of client computer 710. Client computer 710 may receive grant 742 from database computer 721, at which time client computer 710 may begin transmitting data 743, which may be a time consuming stream of many data packets.

Near the end of, or otherwise during, transmitting data 743, client computer 710 sends acquire 744 to database computer 722. In this way, client computer 710 achieves pipelining of transmission transactions, such that interactions of both transactions are interleaved.

10.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
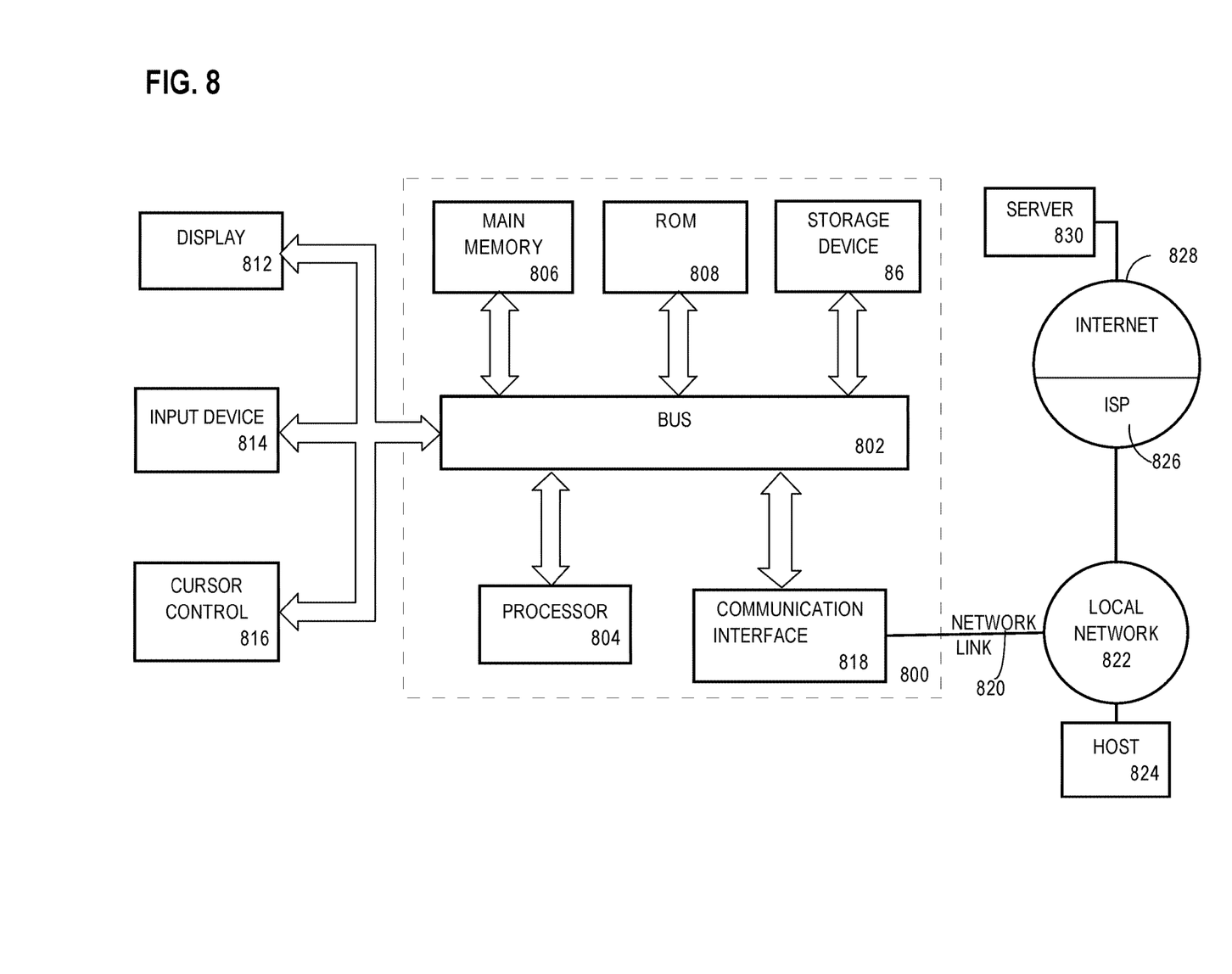
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 86, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 86. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 86. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 86 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 86, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    sending, by a first computer to a second computer comprising a lock, a request to acquire said lock;
    detecting, by said second computer in response to receiving said request to acquire said lock, whether said lock is available;
    sending, to said first computer by said second computer if said lock is unavailable based on said detecting, a denial for said lock, wherein the denial bears at least one of:
        an amount of denials sent by said second computer since said second computer last sent an exclusive grant, or a total amount of unsent data that is associated with said amount of denials;
    sending, to said first computer by said second computer if said lock is available based on said detecting, an exclusive grant of said lock;
    sending, by said first computer in response to receiving said exclusive grant, data to said second computer;
    sending, to said second computer by said first computer after sending said data, a request to release said lock.

2. The method of claim 1 wherein one physical network packet entirely contains at least one of: said request to acquire said lock, or said exclusive grant.

3. The method of claim 1 wherein sending said request to acquire said lock comprises sending an atomic instruction.

4. The method of claim 3 wherein said atomic instruction comprises one of: test-and-set (TAS), or fetch-and-add (FAA).

5. The method of claim 1 wherein:
    the method further comprises splitting an oversized data into two parts comprising: said data and a remainder data;
    said oversized data comprises an amount of bytes that exceed a threshold;
    each of said data and said remainder data comprise an amount of bytes that do not exceed said threshold;
    the method of claim 1 is repeated for said remainder data.

6. A method comprising:
    deciding, by a first computer, a network route, from said first computer to a second computer, comprising one or more network links, wherein each network link of said one or more network links connects two network switches;
    identifying, by said first computer, one or more third computers,
    wherein each third computer of said one or more third computers: is associated with a respective network link of said one or more network links, and comprises a link lock;
    for each third computer of said one or more third computers;
    sending, by said first computer to said third computer, a request to acquire said link lock of said third computer; and
    receiving, by said first computer from said third computer in response to receiving said request to acquire said link lock, an exclusive grant of said link lock of said third computer;
    sending, by said first computer to said second computer comprising a lock, a request to acquire said lock;
    detecting, by said second computer in response to receiving said request to acquire said lock, whether said lock is available;
    sending, to said first computer by said second computer if said lock is unavailable based on said detecting, a denial for said lock, wherein the denial bears at least one of: an amount of denials sent by said second computer since said second computer last sent an exclusive grant, or a total amount of unsent data that is associated with said amount of denials;
    sending, to said first computer by said second computer if said lock is available based on said detecting, an exclusive grant of said lock;
    sending, by said first computer in response to receiving said exclusive grant, data to said second computer;
    sending, to said second computer by said first computer after sending said data, a request to release said lock;
    for each third computer of said one or more third computers, sending, to said third computer by said first computer after sending said data, a request to release said link lock of said third computer;
    wherein said data is sent by said first computer after, for each third computer of said one or more third computers, receiving said exclusive grant of said link lock of said third computer.

7. The method of claim 6 wherein said first computer, said second computer, and said one or more third computers are connected to network switches by connections that each have less bandwidth than the bandwidth of each of said one or more network links.

8. The method of claim 6 wherein:
said deciding is performed by a module within said first computer;
said module comprises one of: a graph analysis framework or a network driver.

9. The method of claim 6 wherein at least one of:
a present lock that is currently acquired by said first computer comprises only one of:
said lock or said link lock;
a future lock that is currently not acquired by said first computer comprises only a different one of: said lock or said link lock;
sending a request to acquire said future lock further comprises:
responsively receiving, by said first computer, a notification that said future lock is currently acquired by a computer that is different from said first computer;
sending, by said first computer before sending said data, a request to release said lock;
restarting said method.

10. The method of claim 1 wherein:
each computer of said first computer and said second computer comprises a database partition of a same table;
sending said request to acquire said lock is in response to receiving a query that identifies said same table.

11. The method of claim 1 wherein sending said request to acquire said lock comprises sending at least one of: an InfiniBand packet, or a Fibre Channel frame.

12. The method of claim 1 further comprising the first computer, responsive to receiving said denial, performing at least one of:
resending said request to acquire said lock after a delay, or
sending, to a third computer comprising a second lock, a request to acquire said second lock.

13. The method of claim 1 further comprising sending, by said first computer to a third computer comprising a second lock, a second request to acquire said second lock, wherein:
sending said second request to acquire said second lock occurs after sending said request to acquire said lock,
sending said second request to acquire said second lock occurs before sending said data.

14. A system comprising:
one or more network switches that are interconnected;
connected to at least one of said one or more network switches, a first computer configured to:
send, to a second computer comprising a lock, a request to acquire said lock;
receive, from said second computer if said lock is unavailable, a denial for said lock, wherein the denial bears at least one of:
an amount of denials sent by said second computer since said second computer last sent an exclusive grant, or a total amount of unsent data that is associated with said amount of denials;
receive, from said second computer if said lock is available, an exclusive grant of said lock;
send, in response to receiving said exclusive grant, data to said second computer; and
send, to said second computer after sending said data, a request to release said lock; connected to at least one of said one or more network switches, said second computer configured to:
receive, from said first computer, a request to acquire said lock;
detect, in response to receiving said request to acquire said lock, whether said lock is available;
send, to said first computer if said lock is unavailable based on said detecting, the denial for said lock;
send, to said first computer if said lock is available based on said detecting, the exclusive grant of said lock;
receive, from said first computer, data to said second computer; receive, from said first computer after receiving said data, a request to release said lock.

15. One or more non-transitory computer-readable media storing instructions that, when executed by one or more processors, cause:
sending, by a first computer to a second computer comprising a lock, a request to acquire said lock;
detecting, by said second computer in response to receiving said request to acquire said lock, whether said lock is available;
sending, to said first computer by said second computer if said lock is unavailable based on said detecting, a denial for said lock, wherein the denial bears at least one of: an amount of denials sent by said second computer since said second computer last sent an exclusive grant, or a total amount of unsent data that is associated with said amount of denials;
sending, to said first computer by said second computer if said lock is available based on said detecting, an exclusive grant of said lock;
sending, by said first computer in response to receiving said exclusive grant, data to said second computer;
sending, to said second computer by said first computer after sending said data, a request to release said lock.

16. The method of claim 1 further comprising:
associating, by said first computer, said data with said second computer;
associating, by said first computer, a second data with a third computer;
deciding, by said first computer and based on criteria, to send said data and said second data in a different order than said data and said second data were obtained.

17. The method of claim 1 further comprising:
sending, by a third computer to said second computer before said sending said request, a second request to acquire said lock;
deciding, by said second computer and based on criteria, to grant said lock to said first computer before said third computer.

18. The method of claim 16 wherein said deciding to send said data and said second data in said different order comprises
at least one of:
generating a random number,
or
detecting that said first computer has a greater amount of data to send to said second computer than to said third computer.

19. The method of claim 17 wherein
said deciding to grant said lock to said first computer comprises at least one of:
generating a random number,
detecting that said first computer has a greater amount of data to send to said second computer than said third computer has to send to said second computer, or
detecting that said first computer has a greater amount of data to send than said third computer has to send.

20. The one or more non-transitory computer-readable media of claim 15, wherein the instructions further cause:
  associating, by said first computer, said data with said second computer;
  associating, by said first computer, a second data with a third computer;
  deciding, by said first computer and based on criteria, to send said data before said second data and comprising at least one of:
    generating a random number,
    detecting that said data was submitted for sending before said second data was submitted for sending, or
    detecting that said first computer has a greater amount of data to send to said second computer than to said third computer.

21. The one or more non-transitory computer-readable media of claim 15, wherein the instructions further cause:
  sending, by a third computer to said second computer, a second request to acquire said lock;
  deciding, by said second computer and based on criteria, to grant said lock to said first computer before said third computer and comprising at least one of:
    generating a random number,
    receiving said request to acquire said lock before said second request to acquire said lock,
    detecting that said first computer has a greater amount of data to send to said second computer than said third computer has to send to said second computer, or
    detecting that said first computer has a greater amount of data to send than said third computer has to send.

22. The one or more non-transitory computer-readable media of claim 15, wherein:
  the instructions further cause:
    deciding, by said first computer, a network route, from said first computer to said second computer, comprising one or more network links, wherein each network link of said one or more network links connects two network switches;
    identifying, by said first computer, one or more third computers, wherein each third computer of said one or more third computers:
      is associated with a respective network link of said one or more network links; and
      comprises a link lock;
    for each third computer of said one or more third computers, sending, by said first computer to said third computer, a request to acquire said link lock of said third computer;
    for each third computer of said one or more third computers, receiving, by said first computer from said third computer in response to receiving said request to acquire said link lock, an exclusive grant of said link lock of said third computer; and
    for each third computer of said one or more third computers, sending, to said third computer by said first computer after sending said data, a request to release said link lock of said third computer;
  said data is sent by said first computer after, for each third computer of said one or more third computers, receiving said exclusive grant of said link lock of said third computer.

23. The one or more non-transitory computer-readable media of claim 15, wherein sending said request to acquire said lock comprises sending an atomic instruction.

* * * * *

UNITED STATES PATENT AND TRADEMARK OFFICE
CERTIFICATE OF CORRECTION

PATENT NO. : 10,263,893 B2
APPLICATION NO. : 15/372224
DATED : April 16, 2019
INVENTOR(S) : Aggarwal et al.

It is certified that error appears in the above-identified patent and that said Letters Patent is hereby corrected as shown below:

On the Title Page

On page 2, Column 1, under Other Publications, Line 3, delete "Took" and insert -- Tools --, therefor.

On page 2, Column 1, under Other Publications, Line 12, delete "Concurrency Concurrency" and insert -- Concurrency --, therefor.

Signed and Sealed this
Third Day of November, 2020

Andrei Iancu
*Director of the United States Patent and Trademark Office*